April 23, 1929.   D. DUNWOODIE   1,710,150
COUPLING FOR ROTARY ELEMENTS
Filed March 21, 1923
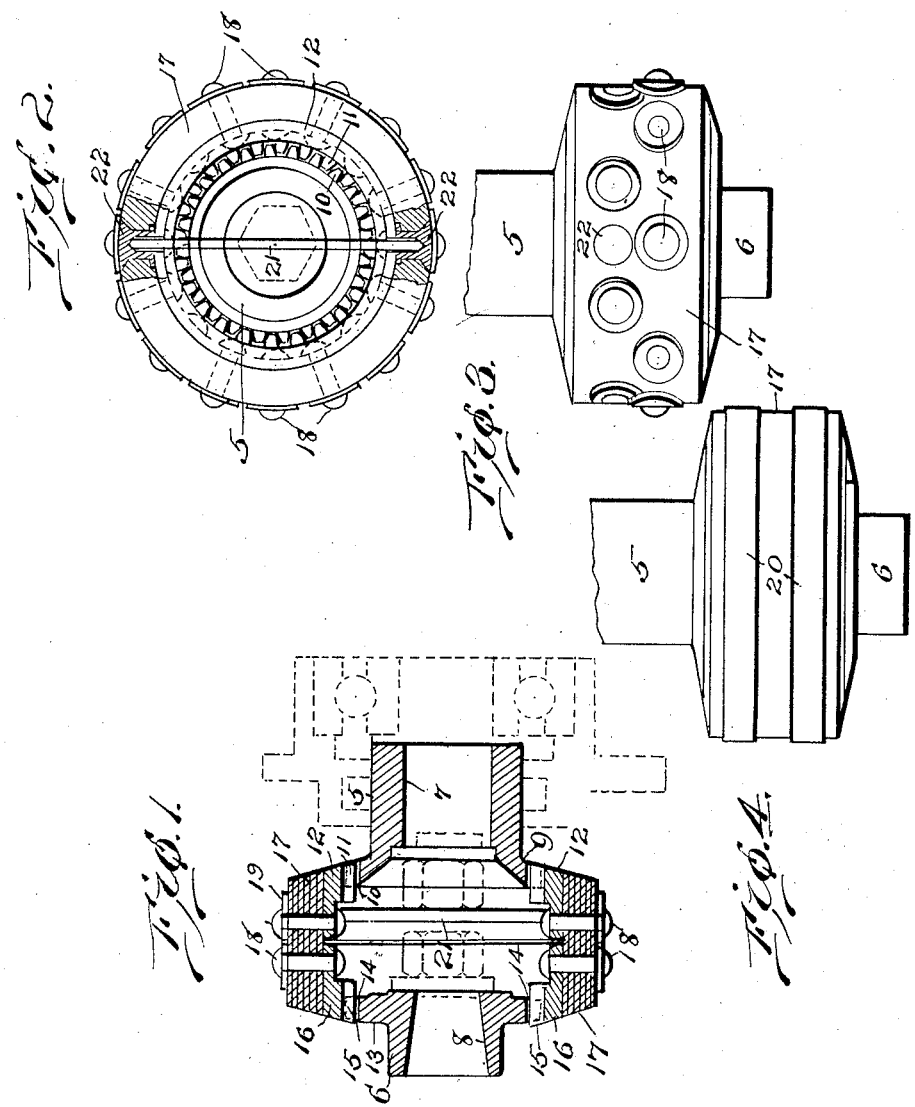

Patented Apr. 23, 1929.

1,710,150

UNITED STATES PATENT OFFICE.

DAVID DUNWOODIE, OF DAYTON, OHIO.

COUPLING FOR ROTARY ELEMENTS.

Application filed March 21, 1923. Serial No. 626,566.

This invention relates to a coupling for connecting together a rotary driving element and a rotary driven element.

The object of the invention is to produce a coupling of the class referred to which has a considerable amount of flexibility to allow for misalignment of the driving and driven members, while at the same time providing for a positive driving engagement between said members. While the invention is particularly designed for use in driving a magneto shaft, it will be evident, as the description proceeds, that the coupling is well adapted for other purposes and is particularly useful in any case where a driving shaft and a driven shaft are not exactly in axial or longitudinal alignment with each other.

With the above and other objects in view, the invention consists in the novel construction, combination and arrangement herein fully described, illustrated and claimed.

In the accompanying drawings,

Figure 1 is a diametrical section through the improved coupling.

Figure 2 is a view thereof partly in side elevation and partly in transverse section.

Figure 3 is a plan view of the coupling.

Figure 4 is a view similar to Figure 3, showing the use of metal bands in place of the washers shown in Figure 3.

Referring to the drawings, 5 represents the driving member and 6 the driven member of the mechanism. In the illustrated embodiment of the invention, the member 5 is shown as having a hub bored as shown at 7 to receive a driving shaft which may be keyed therein. The member 6 is shown as having a tapered bore 8 to receive the end of the driven shaft which may be keyed in the member 6.

In the illustrated embodiment of the invention, the driving member 5 is shown as formed with a circumferential flange 9 having teeth 10 around it, which mesh with other teeth 11 on a gear ring 12. In like manner the driven member 6 is provided with a circumferential flange 13 having teeth 14, which mesh with teeth 15 on a gear ring 16.

Surrounding the rings 12 and 16 is a hollow cylindrical transmission member 17 formed of flexible material such as thermoid or a laminated fabric usually composed of superimposed sections of canvass or other fabric and rubber vulcanized into one unitary article which is flexible throughout and of great durability. The band or transmission member 7 is shown in Figures 1, 2 and 3 as secured to the rings 12 and 16 by rivets 18 which are preferably staggered as shown in Figure 3, metal washers 19 being placed under the heads of the rivets 18. In place of the washers 19 however, annular metal bands 20 may be used as shown in Fig. 4. It will also be observed that the teeth 10, 11, 14 and 15 are of sufficient length to admit of relative sliding and adjustable movements between the driving member 5, the transmission member 17 and the driven element 6. This adds very much to the flexibility of the coupling and it also admits of sufficient sliding movement of the driving element 5 or the driven element 6 to allow the shaft or shafts connected therewith to be removed and replaced.

Due to the comparative lengths of the teeth 10 and 11 and 13 and 14 respectively, angular adjustment is possible between the driving member and the driven member without changing the lateral position of either. This is accomplished by alternately moving the transmission member 17 fore and aft disengaging the teeth at one end thereof from the teeth of one member while the other end is held in engagement; the same action holding true for both fore and aft movement. In this manner a micrometric angular adjustment is obtained between the driving and driven member.

This is a particularly valuable feature for example, as it is ordinarily necessary to demount a magneto from its usual position on the frame of an engine or engine mount to time the same with the firing of the engine.

The teeth of the gears may be made longer or shorter according to requirements in each particular case. The coupling is of small size and is of balanced construction. There are practically no projections other than the heads of the rivets 19 and where the bands 20 are employed the heads of said rivets may, if desired, be countersunk in such bands. The coupling is also light and efficient and the parts are subjected to minimum wear.

It will also be observed that the opposite side faces of the coupling are beveled or reversely inclined. This materially reduces head resistance where the coupling is used on aircraft and also gives greater visibility for adjustment. A flexible centering member 21 extends in an approximately diametrical direction across the interior of the coupling, being terminally attached by socketed means 22 to the transmission member 17 in such a manner that the member 21 can be flexed fore and aft sufficiently to adjust the members 5 and 6 angularly as heretofore described. The member 21 lies between the adjacent faces of the driving and driven elements 5 and 6 or their shafts as shown in Fig. 1 and thus acts normally as a limiting means, to restrict to the necessary degree the relative sliding movement of the elements 5, 6 and 17 in a direction parallel to the axis of rotation of such elements. The gears may have any desired number of teeth and it is not necessary that the same number of teeth be employed in each gear. By having odd numbers of teeth a greater range of adjustment may be obtained.

I claim:

1. A flexible coupling for rotary driving and driven elements comprising a rotary driving member, a rotary driven member, and a rotary motion-transmission member of hollow cylindrical formation composed of flexible material, said transmission member having means fixed thereto providing a positive engagement with both the driving and driven elements and also having a sliding connection with one of said elements in a direction parallel to the axis of rotation.

2. A flexible coupling for rotary driving and driven elements comprising a rotary driving member, a rotary driven member, and a rotary motion-transmission member of hollow cylindrical formation composed of flexible material, said transmission member having a positive engagement with both the driving and driven elements and also having a sliding connection with both of said driving and driven elements in a direction parallel to the axis of rotation for the purpose of adjusting said transmission relative to either of said elements.

3. A flexible coupling for rotary driving and driven elements comprising a rotary driving member, a rotary driven member, and a rotary motion-transmission member of hollow cylindrical formation composed of flexible material having a positive engagement with both the driving and driven elements and also slidable in relation to one of said elements in a direction fore and aft and parallel to the axis of rotation, and means for limiting such sliding movement substantially as described.

4. A flexible coupling for rotary driving and driven elements comprising a rotary driving member, a rotary driven member, and a rotary motion-transmission member of hollow cylindrical formation composed of flexible material having a positive engagement with both the driving and driven elements and also slidable in relation to one of said elements in a direction parallel to the axis of rotation and flexible means yieldably mounted intermediate said driving and driven elements for limiting such sliding movement.

5. A flexible coupling for rotary driving and driven elements comprising a rotary driving member, a rotary driven member and a rotary motion-transmission member of hollow cylindrical formation composed of flexible material having a positive engagement with both the driving and driven elements and also slidable in relation to one of said elements in a direction parallel to the axis of rotation and flexible means yieldably mounted within said hollow transmission member and adapted to coact with the driving and driven elements for limiting such sliding movement.

6. A flexible coupling for rotary driving and driven elements comprising a rotary driving element, a rotary driven element, annular series of projections on said driving and driven elements, and a rotary motion-transmission member of hollow formation composed of flexible material having means fixedly secured thereto comprising annular series of projections to positively engage the projections on said driving and driven elements and also slidable in relation to one of said elements in a direction parallel to the axis of rotation without affecting such positive engagement.

7. A flexible coupling for rotary driving and driven elements comprising a rotary driving member, a rotary driven member, and a rotary motion-transmission member of hollow cylindrical formation composed of flexible material, said transmission member having means fixedly secured thereto comprising a positive engagement with both the driving and driven elements and also having a sliding connection with one of said elements in a direction parallel to the axis of rotation, said transmission member having opposite faces thereof reversely inclined.

8. A flexible coupling for rotary driving and driven elements each having a series of peripheral teeth, a pair of ring gears one in mesh with the teeth of the driving element, the other in mesh with the teeth of the driven element, and flexible means fixedly secured to each of said ring gears retaining said gears in mesh with the driving and driven elements.

9. A flexible coupling for rotary driving and driven elements comprising a rotary driving member, a rotary driven member, annular series of projections on said driving and driven elements, and a rotary motion-transmission member of hollow formation composed of flexible material having means fixedly secured thereto comprising annular series of projections to positively engage the projections on said driving and driven elements and also slidable in relation to one of said elements in a direction parallel to the axis of rotation without affecting such positive engagement, and means mounted interiorly of said driving and driven members for limiting said sliding movement.

10. A flexible coupling for rotary driving and driven elements comprising a rotary driving member, a rotary driven member, and a rotary motion-transmission member of hollow cylindrical formation composed of flexible material, said transmission member having means fixedly secured thereto comprising a positive slidable engagement with both the driving and driven elements in a direction parallel to the axis of rotation, said transmission member having opposite faces thereof reversely inclined, and means mounted interiorly of said driving and driven members for limiting said sliding movement.

11. The combination with a driving and driven element, of a flexible ring bodily movable along its longitudinal axis to effect the displacement of said ring relative to either of said elements whereby the angular relation of said elements is capable of being changed and means yieldably mounted intermediate said driving and driven elements for limiting the longitudinal movement of said flexible ring.

12. The combination with a driving and driven element, of a manually bodily movable device encircling said driving and driven members, said device having means fixed thereto permitting a positive slidable engagement with both the driving and driven members and flexible means yieldably mounted within said encircling device and intermediate said first mentioned means, said last mentioned means being adapted to automatically return said encircling device from a sub-normal position relative to said driving and driven members.

13. The combination with a driving and driven member, each having an annular series of peripheral teeth, of a hollow flexible ring encircling said member, a pair of ring gears mounted within said hollow ring, one in mesh with the teeth of the driving member, the other in mesh with the teeth of the driven member, said gears and hollow ring being adapted to be movable bodily along the longitudinal axis thereof to effect the displacement of either of said ring gears relative to either of said members to permit of the relative angular adjustment of either the driving or driven member.

14. The combination with a driving and driven element each having an annular series of teeth, of a longitudinally bodily movable hollow ring member intermediate and encircling said driving and driven elements, a pair of ring gears mounted within said hollow ring member for engaging the teeth on said driving and driven elements, the number of teeth on one ring gear being greater than the number of teeth on the other gear and flexible means yieldably mounted interiorly of said ring for limiting the longitudinal movement thereof.

In testimony whereof I affix my signature.

DAVID DUNWOODIE.